Sept. 11, 1956   A. D. L. HUTCHINSON   2,762,650
RECOIL MECHANISM FOR DUMP TRUCKS
Filed Jan. 19, 1953   2 Sheets-Sheet 1
Fig. 1
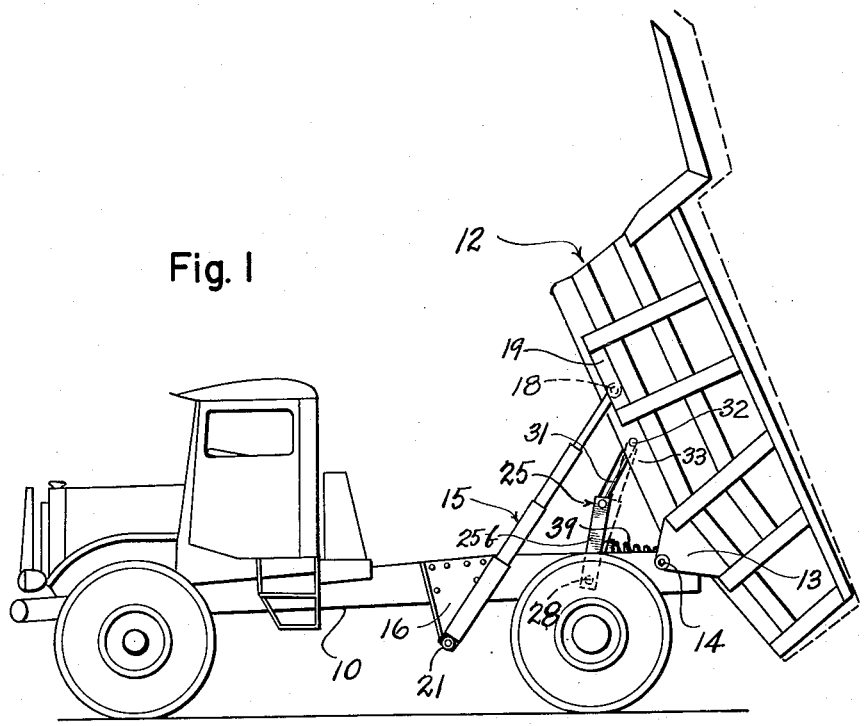
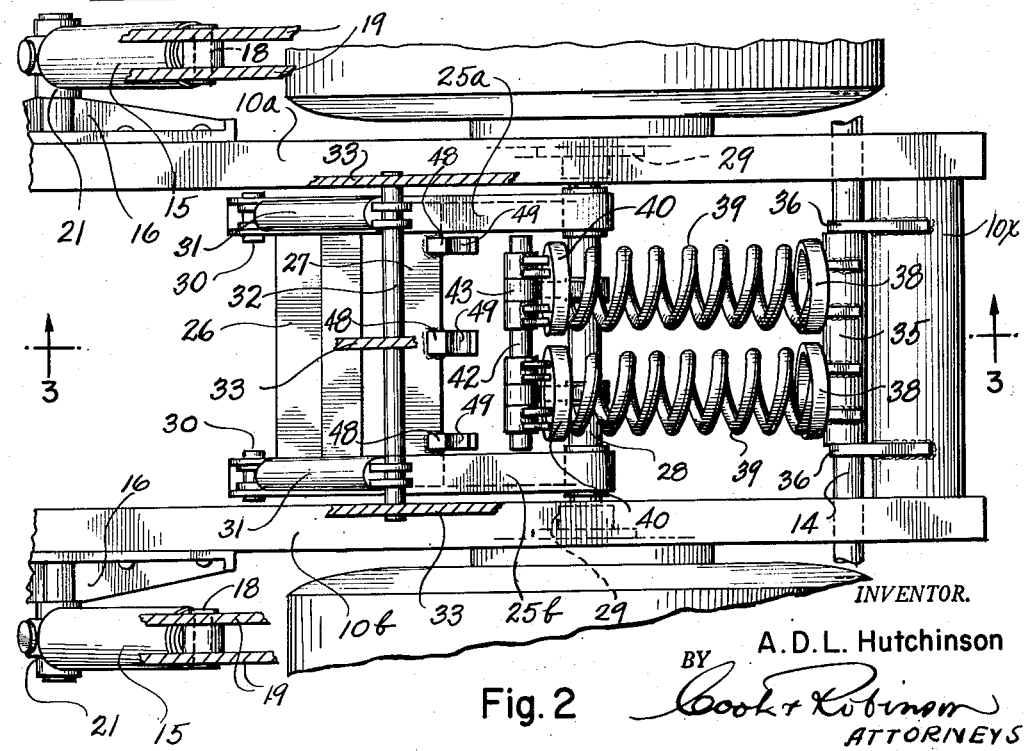
Fig. 2
INVENTOR.
A.D.L. Hutchinson
BY Cook + Robinson
ATTORNEYS Sept. 11, 1956  A. D. L. HUTCHINSON  2,762,650
RECOIL MECHANISM FOR DUMP TRUCKS
Filed Jan. 19, 1953  2 Sheets-Sheet 2

INVENTOR.
A.D.L. Hutchinson
BY
Cook & Robinson
ATTORNEYS

2,762,650

RECOIL MECHANISM FOR DUMP TRUCKS

Archibald D. L. Hutchinson, Seattle, Wash.

Application January 19, 1953, Serial No. 331,787

4 Claims. (Cl. 298—19)

This invention relates to improvements in dump trucks and it has reference more particularly to trucks having dump bodies hingedly mounted for "high angle" rear end dumping and which are actuated from lowered, loading position to the high angle dumping position by means of a hydraulic jack or jacks, and are stopped or limited in their dumping movement by means of an equalizing toggle linkage which provides a connection between dump body and vehicle chassis.

It is the primary object of this invention to equip dump trucks of the above kind with novel resilient shock absorbing means for retarding the movement of the dump body as it moves to its final dumping position under the influence of the load therein, thus to eliminate jar or shock incident to the dumping action of the body, and also to so associate the shock absorbing means with the toggle linkage that it will act thereagainst in retarding the body movement, and for the return of the body to a position that insures self lowering under its own weight. Furthermore, to so associate the shock absorbing means and toggle linkage that full advantage is taken of the leverage afforded by the linkage.

Further objects of the invention reside in the details of construction of the present recoil mechanism and in its combination and cooperative relationship with the equalizer linkage and other parts of the dump truck.

In accomplishing the above mentioned objects of the invention, I have provided the improved details of construction, the preferred forms of which are illustrated in the accompanying drawings, wherein:

Fig. 1 is a side view of a dump truck equipped with a recoil mechanism and equalizer mechanism in accordance with the teaching of the present invention.

Fig. 2 is a top, or plan view of the rear end portion of the chassis of a dump truck, showing the disposition of the present recoil mechanism and equalizer linkage.

Figure 3:
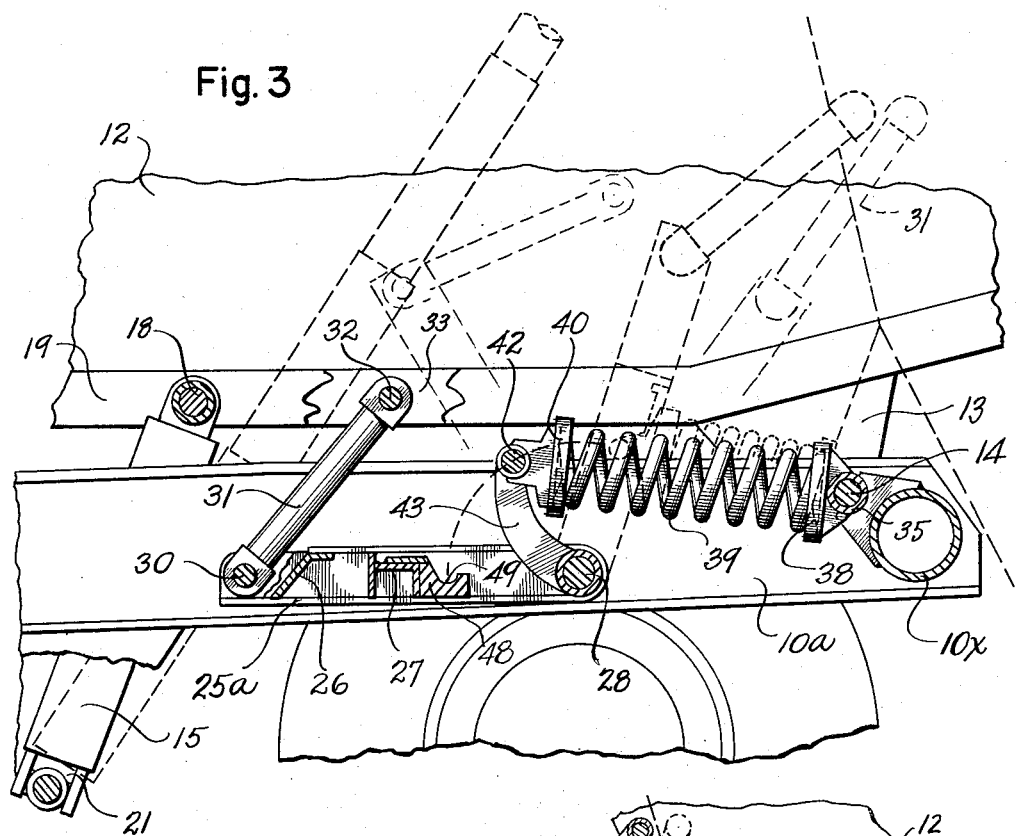
Fig. 3 is a vertical section, taken substantially on the line 3—3 in Fig. 2, particularly showing the relationship of the recoil and equalizer mechanisms.

Referring more in detail to the drawings:

In Fig. 1, I have illustrated a dump truck of a typical form, comprising a wheel supported chassis 10 on which a body 12 is mounted for rear end dumping, as indicated. The body 12 is here shown to be equipped, at the under side and near the rear end of its bed or bottom, with downwardly directed supporting brackets 13 which are pivotally mounted on a cross-shaft 14 that extends through the opposite side beams of the chassis, near its rearward end.

To effect the raising and lowering of the body, the truck is equipped with a pair of hydraulic jacks, 15—15. These jacks are represented as being of the telescopic type and, as shown in Fig. 2, are located at opposite sides of the truck chassis substantially forward of the cross-shaft 14 and at their lower ends are pivotally supported from the opposite side beams of the truck chassis by means of hanger brackets 16—16, and at their upper ends have pivotal connection, as indicated at 18 in Fig. 1, with longitudinal members 19 associated with the bottom of the truck body. In this particular truck, the jacks 15—15 have universal joint mountings at their lower ends, indicated at 21, in order to provide for both lateral and longitudinal oscillation of the jacks, thus to relieve the jacks of undue strain and wear. In view of the use of full oscillating jacks, and to give more strength and stability to the truck, it is desirable that it be equipped with an equalizing linkage to stabilize the dumping action, especially if the vehicle is operating on a laterally sloping surface. The desirability for use of this type jack or hoist and this particular equalizing mechanism is disclosed in my U. S. patent application filed on June 18, 1951, under Serial No. 232,171, now Patent No. 2,731,293.

The equalizing linkage, which in Fig. 1 is designated in its entirety by reference numeral 25, is shown to be made up of pivotally joined upper and lower members which, respectively, are pivotally attached at their outer ends to the dump body and to the chassis. The lower end member of the linkage is shown in Figs. 2 and 3, to comprise a rigid frame structure composed of opposite side bars 25a and 25b; these being rigidly joined in their spaced relationship by cross members 26 and 27. This rigid frame structure is disposed horizontally between the opposite side beam 10a and 10b of the chassis, with the bars 25a and 25b parallel with and close to the side beams of the chassis. At what will be referred to as their lower ends, the bars 25a—25b are pivotally mounted on a horizontal cross shaft 28 that extends between and is mounted at its ends in bearings 29—29 that are fixed to the chassis beams 10a and 10b as indicated in Fig. 2.

At their upper ends, the bars 25a—25b are pivotally fixed by pivot pins 30 to the lower ends of parallel links 31—31 which, in turn are pivotally mounted at their upper ends on a cross-shaft 32 that is mounted horizontally in longitudinal members 33 in the bottom structure of the dump body. The cross-shaft 28 is located parallel with and somewhat forwardly of the hinge shaft 14 about which the dump body pivots, and the cross-shaft 32 that connects the links 31 with the dump body is so located that when the dump body is in a lowered position, the equalizing linkage 25 will be in the retracted or jack-knifed position in which it is shown in full lines in Fig. 3. When the body is moved from a lowered to raised position, the equalizing linkage swings upwardly with the body movement, passing through the dotted line positions shown in Fig. 3 to the dotted line position in which it is shown in Fig. 1; this latter position is what would be the dead center position of the linkage, and at that position, it positively stops further dumping movement of the body 12. To permit the body to lower, it is then necessary that the linkage 25 be actuated forwardly, off the dead center, for example, returned to its full line position in Fig. 1.

In high angle dump trucks of the type shown, it is quite desirable that means be provided to absorb the shock or jar that is incident to the body reaching its limit of travel toward dumping position. It is also quite desirable in trucks using a hydraulic lift and an equalizing linkage of the present type, that a recoil means be provided to return the body back somewhat from the high angle dumped position, and also to break the equalizing linkage off of a dead center position to make possible the self lowering of the body and the return of the jacks to retracted positions under the weight of the dump body. Such a recoil means has herein been illustrated, in a present preferred embodiment in Figs. 1, 2 and 3, and an alternative mechanism has been shown in Fig. 4. In each instance, a resilient means cushions the final dumping action of the body and absorbs the shock, then operates to return the body somewhat from the high angle dumping position to a self lowering position. First describing the means disclosed in Figs. 1, 2 and 3:

Rigidly supported between the opposite side beams of the chassis 10, closely adjacent the rear end of the chassis, is the previously mentioned cross-shaft 14 about which the dump body pivots. The ends of this shaft are shown to extend through and beyond the side beams of the chassis to serve as the mounting pivots 14 on which the rear end supporting brackets 13 of the body are mounted.

Mounted on the cross shaft 14 medially of its ends, is a sleeve 35 that is held against endwise shifting thereon between brackets or flanges 36—36 that are welded to a tubular cross-member 10x that joins the rear end portions of the opposite side beams of the chassis. Mounted on the sleeve 35, and symmetrically located at opposite sides of the central longitudinal plane of the vehicle, are forwardly facing spring mounting pads 38 and 38 in which the rear ends of paired, heavy coil springs 39—39 are seated. At their forward ends, these coiled springs seat in pressure pads 40—40 which are pivotally mounted, as well shown in Figs. 2 and 3, on a horizontal cross-shaft 42. The cross shaft 42 is supported by a pair of links 43—43 which are laterally spaced in accordance with the axial spacing of the two springs, and at their lower ends are pivotally mounted on the cross-shaft 28, and curve upwardly and forwardly therefrom for support of cross-shaft 42, at a level that is somewhat above the level of cross-shaft 14.

Welded or otherwise fixed to the cross member 27 of the equalizer linkage, in spaced relationship as seen in Fig. 2, are three stop lugs 48, each formed with an upwardly facing seat 49. These lugs are so spaced from the shaft 28 that when the lower end element of the linkage swings upwardly, the seats of the lugs will engage against the cross-shaft 42 and, with the continued dumping movement of the body, will cause the coiled springs 39 to be compressed, as has been indicated in dotted lines in Fig. 3. As the springs 39 are thus compressed, the dumping movement of the body is retarded and eased to the final position at which the two parts of the linkage assumes the straight line relationship seen in dotted lines in Fig. 1; that being the dead center position. Upon its being finally stopped by the equalizer linkage at this high angle dumping position, the vertical forces of the body are overcome by the expanding forces of the compressed springs 39—39 and, acting against the cross shaft 42 and lugs 48 on the cross member 27 of the equalizer, they brake the linkage back from the dead center condition and effect a partial return or lowering of body, thus moving it to a position of self lowering under its own weight and the restoration of the jacks to retracted positions with lowering of the body.

Figure 4:
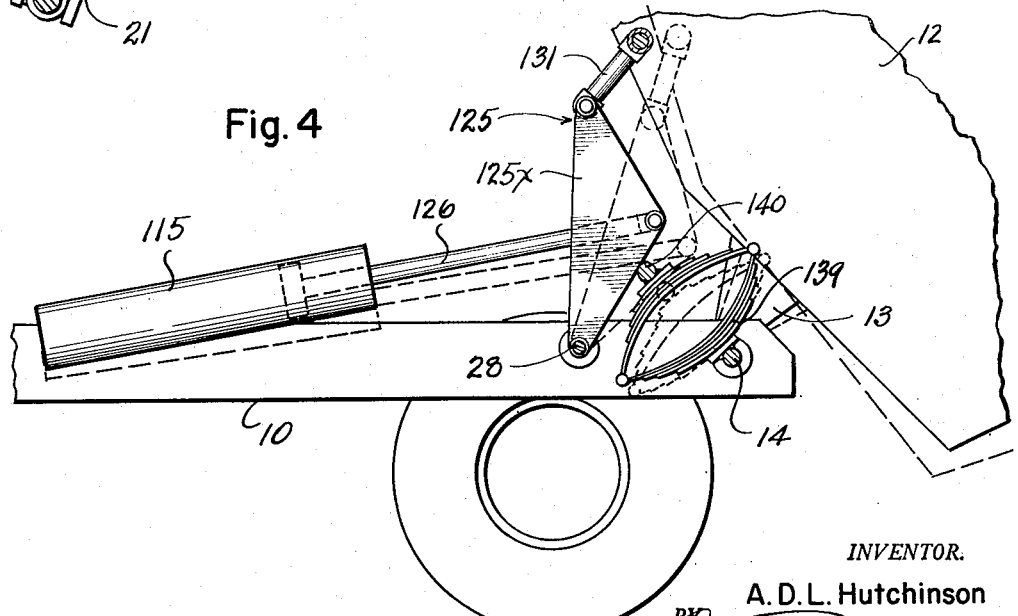
Fig. 4 is a similar view, illustrating an alternative form of recoil mechanism.

The alternative recoil mechanism of Fig. 4 is shown in association with a modified equalizer linkage and an under body hoist. In this view, the hoist is designated at 114 and the equalizer is designated in its entirety at 125. The dump body 12 is shown to be pivotally mounted on the cross shaft 14, as in Fig. 1, and to be actuated between lowered and dumping positions by the hoist 115. However, the piston rod 126 of the jack is here pivotally connected to the lower member of the equalizer instead of having direct connection with the body. The equalizer comprises a lower, rigid frame with triangularly shaped opposite side plates 125x which at their lower ends are pivoted on the cross-shaft 28, and at their other ends are connected with the dump body links 131.

The recoil device comprises a pair of laterally spaced elliptical springs 139 mounted on cross-shaft 14 and joined by a cross bar 140 that is supported thereby in position to be engaged by and compressed by the movement of the plates 125x against them. Thus they operate in the same manner and for the same purpose as the spring 39 of the mechanism of Fig. 1.

The particular advantage residing in the use of recoil springs as hereinshown with a toggle linkage of the character disclosed, resides in the fact that full advantage is taken of the increased leverage afforded in such linkage. The multiplication of power that is possible by use of such toggle linkage is well known and is demonstrated by its application to rock crushing and similar types of machines. In the present instance, the force of the recoil springs, acting against the linkage in the manner shown, is materially multiplied in its application to the body for its quick and positive return to self-lowering position. The use of the recoil springs with a linkage of this character is one of the main features of the present invention, and it is not necessary that the linkage be used as an equalizing mechanism.

It is to be understood that although the present recoil mechanism shows the shock absorbing springs so arranged as to be placed under compression in effecting the retarding and recoil action, it is quite possible to obtain a like result in an arrangement wherein the recoil springs are placed under tension in effecting the only retarding and recoil action. Therefrom, it is not the intent that the claims be restricted to the particular arrangement illustrated.

Having thus described my invention, what I claim as new therein, and desire to secure by Letters Patent is:

1. In a dump truck comprising a chassis having means on the rear end for securing a dump body, a dump body hingedly secured to said means, powered lifting means mounted on the chassis for actuating the dump body between a lowered position and a dumping position, a hingedly mounted load equalizing means secured at one end to the chassis and at its opposite end to the dump body at points forwardly from the rear end of the chassis, a recoil mechanism mounted on the chassis rearwardly of equalizing means and interconnected with the equalizing means, said mechanism including spring means compressible by the equalizing means incident to the movement of the dump body to a final dumping position whereby the spring means cushions the final dumping movement of the body and exerts force to partially return of the body to a position at which it becomes self lowering.

2. In a dump truck, a chassis having a rear end cross member rigidly fixed therein, a dump body hinged to the chassis for rear end dumping, power applying means mounted on the chassis for actuating the body between lowered and dumping positions, toggle linkage hingedly connected at one end to the chassis and at the other end to the body at points forwardly of the cross member, a recoil mechanism comprising spring seats mounted on said cross member, springs mounted therein and supported for engagement and compression by the toggle linkage as the parts of the linkage move into a relationship of alignment with the moving of the body to dumping position, said springs being operable to cushion the final dumping movement and to effect the partial return of the body to a position at which it becomes self-lowering.

3. In a dump truck, a chassis having a rear end cross member, a dump body hinged to the chassis for rear end dumping, full oscillating jacking means mounted on the chassis for actuating the body from lowered to dumping position, an equalizing toggle linkage hingedly connected at one end to the chassis and at the other end to the body forwardly of the cross member, a recoil mechanism comprising a pair of laterally spaced spring seats mounted on said cross member, a second pair of opposing spring seats supported forwardly of the first mentioned seats and paired therewith, coiled springs applied at their opposite ends to the respective opposed seats, said second mentioned seats being disposed for engagement and movement by said toggle linkage in its straightening movement with the final dumping movement of the body to cushion its stop and then by acting against said linkage to effect a partial return of the body to a position at which it becomes self lowering.

4. The combination recited in claim 3 wherein said equalizing toggle linkage comprises paired laterally spaced links hingedly connected together at their inner end, and wherein one of the sets of links is hinged to the chassis by a cross shaft that rotates in its mountings with the swinging of the links, and wherein lever arms extend radially from the said shaft and mount said second mentioned spring seats thereon.

References Cited in the file of this patent

UNITED STATES PATENTS

| | | |
|---|---|---|
| 1,854,212 | Miller | Apr. 19, 1932 |
| 1,858,797 | Wood et al. | May 17, 1932 |
| 2,631,888 | De Hart | Mar. 17, 1953 |

FOREIGN PATENTS

| | | |
|---|---|---|
| 4,374 of 1913 | Great Britain | Feb. 19, 1914 |